United States Patent [19]

Heising et al.

[11] Patent Number: 4,657,387

[45] Date of Patent: Apr. 14, 1987

[54] METHOD OF AND APPARATUS FOR THE INVESTIGATION OF INACCESSIBLE SUBTERRANEAN SPACES SUCH AS BOREHOLES

[75] Inventors: Ferdinand Heising, Werne; Wilhelm Knickmeyer, Essen, both of Fed. Rep. of Germany

[73] Assignee: Bergwerksverband GmbH, Essen, Fed. Rep. of Germany

[21] Appl. No.: 742,281

[22] Filed: Jun. 7, 1985

[30] Foreign Application Priority Data

Jun. 15, 1984 [DE] Fed. Rep. of Germany ....... 3422271

[51] Int. Cl.⁴ ............................................. G02B 23/26
[52] U.S. Cl. ....................................... 356/72; 356/241
[58] Field of Search .................................. 356/241, 72

[56] References Cited

U.S. PATENT DOCUMENTS

| | | | |
|---|---|---|---|
| 3,417,745 | 12/1968 | Sheldon | 356/241 X |
| 3,614,891 | 10/1971 | Nolte | 356/241 X |
| 4,281,929 | 8/1981 | Lord et al. | 356/241 |
| 4,490,606 | 12/1984 | Lockett et al. | 250/227 |
| 4,557,598 | 12/1985 | Ono et al. | 356/241 |

Primary Examiner—Vincent P. McGraw
Attorney, Agent, or Firm—Karl F. Ross; Herbert Dubno

[57] ABSTRACT

A method of and an apparatus for investigating subterranean boreholes especially in bituminous coal mining. Optical fiber cables carry light for illuminating the hole into the latter and an image of the wall of the borehole from the latter to an evaluating means external of the borehole.

3 Claims, 2 Drawing Figures

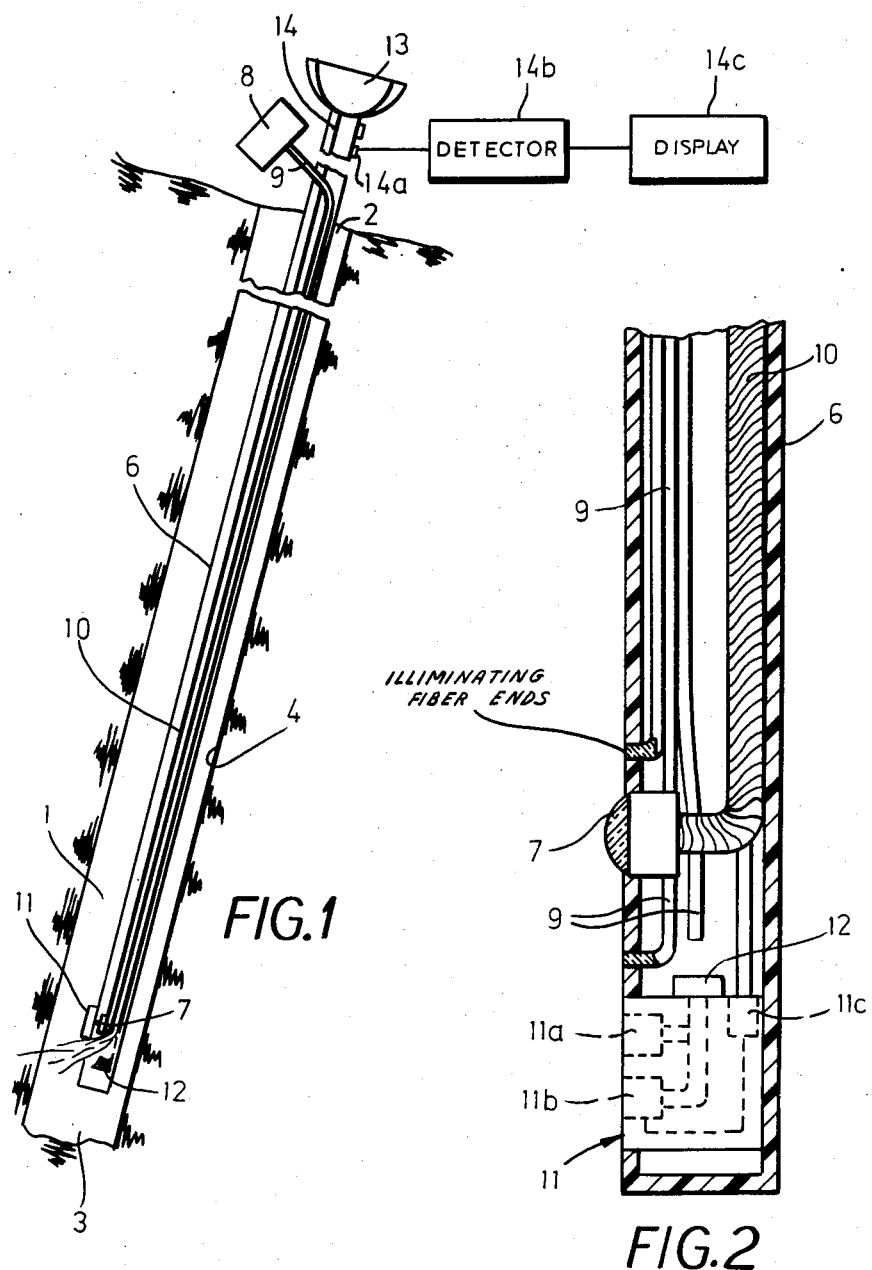

METHOD OF AND APPARATUS FOR THE INVESTIGATION OF INACCESSIBLE SUBTERRANEAN SPACES SUCH AS BOREHOLES

FIELD OF THE INVENTION

The present invention relates to a method of and to an apparatus for the investigation of boreholes and other inaccessible subterranean spaces and, more particularly, exploratory and gas borings made in subterranean structures, generally in conjunction with coal extraction, e.g. in the mining of bituminous coal.

BACKGROUND OF THE INVENTION

The drilling of boreholes from subterranean locations through subterranean strata and structures is carried out for a wide variety of reasons and in many cases it is desirable to monitor the wall of the borehole or to detect possible faults or characteristics of the structure constituting the wall of the borehole.

Boreholes can also be drilled in oil and gas exploration, can be exploratory holes to determine the nature of subterranean structures and even can be holes of the type mentioned which are necessary in association with the mining of bituminous coal, for example.

Such holes can have lengths ranging from several meters to several hundred meters and even several kilometers in some cases.

An obvious way of monitoring a characteristic of the hole is to use a coring drill to extract a core of the material which can be evaluated to determine the particular structure at various depths, e.g. to determine the presence or absence of certain mineral matter.

Coring drilling cannot always be used, however, and direct monitoring of the nature of the structure via the drillings brought up by a drill is less satisfactory from the point of view of determining the subterranean structures through which the drilling is effected.

It is also desirable to evaluate the subterranean structures or production holes, i.e. bore holes drilled to extract natural gas. In bituminous coal mining and exploration, gas extraction and detection holes may also be drilled in the subterranean structure and such holes also may be drilled simply to explore the mining path or the vein or coal structure.

In general, therefore, considerable amounts of valuable information can be obtained by monitoring the wall structure of a borehole.

In large-bore technology, for example in the formation of large-diameter boreholes which are utilized for petroleum and natural gas production, it is already known to lower from the drilling site on the surface of the ground above the borehole a television camera into the latter together with an illuminating system so that the wall of the borehole is illuminated and a view can be taken thereof through a television system.

Because the camera must be relatively small and compact, and nevertheless provide high resolution, the cost of such systems, especially the camera, is relatively high.

Video cameras, moreover, generally require high-power lighting which likewise increases the cost and requires that the investigation be carried out independently from any other operations. In other words, such boring operations cannot be carried out with simultaneous drilling and other wall-monitoring investigations.

Finally, it should be noted that these techniques are not applicable at all with relatively small caliber bores of the type used in subterranean coal mining operations, e.g. when the drilling is effected from a subterranean location rather than from above the ground, and in other small-caliber subterranean drilling operations.

OBJECTS OF THE INVENTION

It is, therefore, the principal object of our present invention to provide an improved method of investigating, monitoring or evaluating a subterranean borehole of the type described whereby the aforementioned disadvantages can be obviated.

Another object of this invention is to provide an improved method of investigating relatively small-caliber exploratory gas boreholes which cannot be investigated by conventional television camera technology.

Yet another object of the invention is to provide an improved apparatus for carrying out this method.

Still another object of our invention is to provide an apparatus which allows the investigation of small-diameter boreholes inexpensively and without the disadvantages of earlier exploration systems.

SUMMARY OF THE INVENTION

These objects and others which will become apparent hereinafter are attained, in accordance with the present invention, by directing a beam of light along an optical (glass) fiber light guide into the borehole and detecting through a glass fiber light cable an image of a wall of the borehole, the fiber cable signals being evaluated at a location externally of the hole.

It has already been proposed in various phases of medical research and clinical work to utilize optical fiber cables for affording the possibility of viewing or producing an image of a cavity in the human body or other subject which is not otherwise accessible except through surgery. In nondestructive testing and evaluation of certain materials, in addition, it is known to provide an optical fiber system again to find access to internal compartments or passages which would not otherwise be accessible except by destroying the workpiece or a material.

Consequently, up to now such techniques have been employed successfully as far as we understand, only in applications which have a comparatively short path and for extremely narrow passages or compartments which closely surround the exploratory head.

We have found, however, that such techniques can be used effectively as well in coal mining applications, for example, by insertion of the exploratory device at least several meters into a gas borehole in such applications with significant advantage since both the light source and the image evaluator can be located outside the borehole. Since illumination is effected with cold light, i.e. light delivered at a location remote from any source of spark or heat generation or the like, the danger of explosion of subterranean gases is excluded.

The invention can be applied at comparatively low cost to medium-diameter and small-caliber bores which could not be illuminated with light sources of the type hitherto required for video cameras and the like.

The image of the wall of the bore is delivered to the mouth thereof with optical fiber cable and preferably glass-fiber optical cable so that the image which is ultimately viewed and evaluated can have a high degree of resolution and precision in spite of the considerable distance between the viewing "window" of the optical fiber cable and the evaluating means. We have found that in spite of the small size and the absence of a video camera, the device of the invention allows with great accuracy the detection of the position of the minerals, the nature of the strata and even the density and porosity of the subterranean structure and the overall quality of the borewalls.

The system can be used to control bore casing and, for example, for freeze boreholes.

Advantageously, the light energy delivered to the exploratory end of the device can be converted in part into energy for activating one or more sensors for effecting any desired measurements within the borehole. Suitable measurements which can be made are measurements of density of the rock structure, porosity and conductivity. A suitable sensor for this purpose can be a sonic generator which can be associated with a sonic transducer to pick up an echo from the wall of the bore. Any conventional measuring or sensing device which provides useful data can be employed for this purpose.

The data can be transmitted in part through the glass fiber optical cable in the form of pulses or modulations of the optical signal to the evaluating station at the surface.

The system of the invention, therefore, provides a highly precise measurement technique which because the optical fiber cable can transmit vast amounts of information with a minimum of attenuation practically instantaneously, is less sensitive to disturbance and is able to provide a more immediate evaluation of the monitored parameter.

The method of the invention can be carried out utilizing an apparatus which includes a light source and an adjustable means for coupling the light source with the optical fiber-light transmitter illuminating the hole at the end of a light cable.

Evaluating or analyzing means for the image and data are provided at the end of this cable externally of the hole together with a light source. The light energy is thus transmitted through the cable or an optical fiber into the hole to provide the illumination required for the image to be picked up by the cable and fed back through optical fibers thereof to the evaluating means.

The pickup at the end of the cable within the hole can be provided with any necessary optical system and it has been found to be advantageous to be provided at the pickup and the cable in a tube with the aid of which the pickup and cable can be introduced into the hole. A lateral wall of the hole can have an opening through which the optical pickup is trained on the bore wall. The tube can be rotatable so that the optical pickup can be trained on the wall all around the axis of the borehole.

Apart from the optical pickup, the tube can carry one or more sensors which can be fed with light from the light-supply optical fiber cable, these sensors including special photodiodes which can assist in transforming light energy into electrical energy for the sensors detecting the wall porosity and electrical conductivity as well as other data if desired With the aid of the apparatus of the invention, the borehole can be investigated section by section simply by progressively advancing the end of the tube in the apparatus described and rotating same.

Rotation of the tube can be effected using a rigid tube or a tube composed of a synthetic resin and having a limited degree of flexibility so that the tube can follow a borehole which may not be completely straight but also can be used with a straight tube. Because the cable and pickup are protected by this tube, damage by catching on irregular tube walls is avoided.

The invention is also applicable to angled boreholes and holes branching in appropriate cases because of the flexibility of the tube and, of course, the flexibility of the optical cable.

We have found that we can obtain highly precise images and data with the present invention from small- and middlecaliber boreholes and at comparatively low cost since both the fabrication and capital cost of the device and its operating and monitoring costs are low.

BRIEF DESCRIPTION OF THE DRAWING

The above and other objects, features and advantages of the present invention will become more readily apparent from the following description, reference being made to the accompanying drawing in which:

FIG. 1 is a diagrammatic section through a borehole under investigation by an apparatus according to the invention; and FIG. 2 is a section, greatly enlarged in scale with respect to FIG. 1, but illustrating a portion of the apparatus.

SPECIFIC DESCRIPTION

As can be seen from FIG. 1, a device for investigating the walls of a borehole 1 can be introduced through the mouth 2 of this otherwise inaccessible hole, practically to the lowest point 3 thereof, this device comprising a hollow tube 6 which lies substantially parallel to the bore wall 4.

The hollow tube has an optical pickup 7 and is provided with an illuminating device 8 for illuminating the area of the borehole to be investigated. The illuminating device 8 can be a high intensity lamp which is located outside the borehole and which delivers its light energy by an optical fiber supply cable 9 to the borehole.

The cable to the borehole is affixed to the wall of the hollow tube so that the ends of the glass fiber extend perpendicular thereto or at an inclination thereto as can be seen from FIG. 2.

The image received by the pickup 7 is delivered by the optical fiber cable 10 to the region of the mouth of the bore and is detected by an evaluating means here shown to be an ocular or sensor system 13 to which the eye of an investigator can be applied.

Naturally, these evaluating means can be an electronic image analyzer or the like.

The connecting fitting 14 can permit the connection of such an evaluating device.

In addition to the pickup 7, the end of the tube 6 can be provided with one or more sensors 11 which are electronic and receive their energization by a light-stroke electrical transducer, here represented as having a photo diode 12 or other photo cell. As can be seen from FIG. 2 as well, the unit 12 generates electrical energy which supplies the sensor 11 and this can include an emitter 11a, e.g. of ultrasonic waves, which can be reflected from the wall to an ultrasonic pickup 11b which, in turn, is connected to a modulator 11c. For applying pulses to at least part of the beam carried by the cable 10, there is at the upper end of the cable 10 a further connection provided to a detector 14b generating a display 14c of the measured parameter, in this case, the porosity of the wall.

Similarly, electrical energy for a pair of conductivity electrodes in wiping contact with the wall can be provided.

We claim:

1. A method of investigating a borehole, especially a small or medium caliber borehole in a subterranean structure in bituminous coal mining, which comprises the steps of:

transmitting a light beam into the interior of a subterranean borehole through an optical fiber illuminated by a source external of said borehole;

forming an image of at least a region of said borehole within said borehole;

transmitting said image through a fiber optical cable from the interior of said borehole to a point externally thereof for reevaluation; and activating an electrically operated sensor within the interior of said borehole by transforming part of the light energy from said optical fiber in the interior of said borehole into electrical energy and utilizing said electrical energy at least in part for electronic detection of data in said borehole independent of the transmission of said image.

2. The apparatus defined in claim 1 wherein said tube is a synthetic resin tube of limited flexibility.

3. An apparatus for the investigation of a borehole and inaccessible spaces, especially in bituminous coal mining comprising:

a hollow tube insertable in a borehole;

an optical fiber supply cable extending through said tube from one end thereof substantially to an opposite end thereof, said one end being external of said borehole;

means for illuminating said supply cable at said one end whereby said supply cable transmits light energy to the interior of said hole;

pickup means on said tube in said hole for picking up an image of a portion of a wall thereof;

an optical fiber signal-carrying cable connected to said pickup means and extending through said tube to said one end thereof;

means at said one end of said tube for evaluating said image; and means associated with said pickup means on said tube and energized through a light/electrical transducer from said supply cable for detecting a parameter of said borehole independently of said image.

* * * * *